July 4, 1967  N. CORDIS  3,329,127
AUTOMATIC LAYING CAGE SYSTEM
Filed March 22, 1966  2 Sheets-Sheet 1
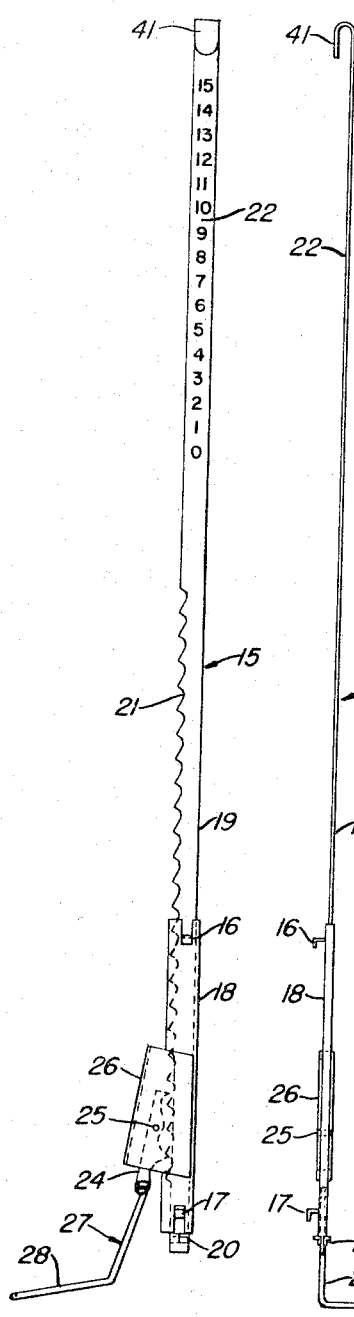
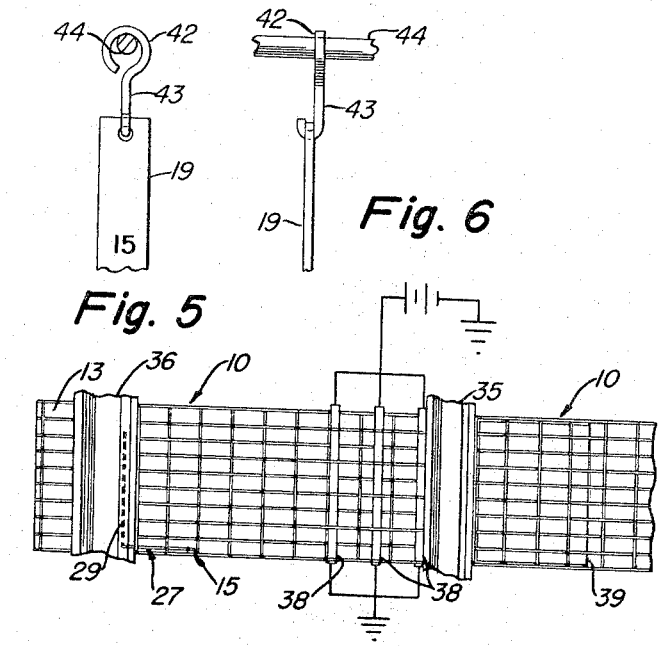
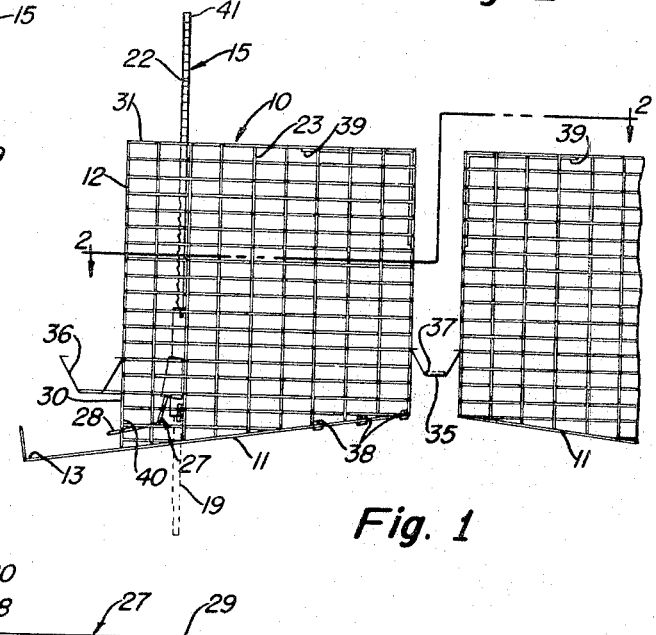
INVENTOR.
NAT CORDIS, Deceased,
By GLADYS S. CORDIS of CHICAGO, ILL., Executor

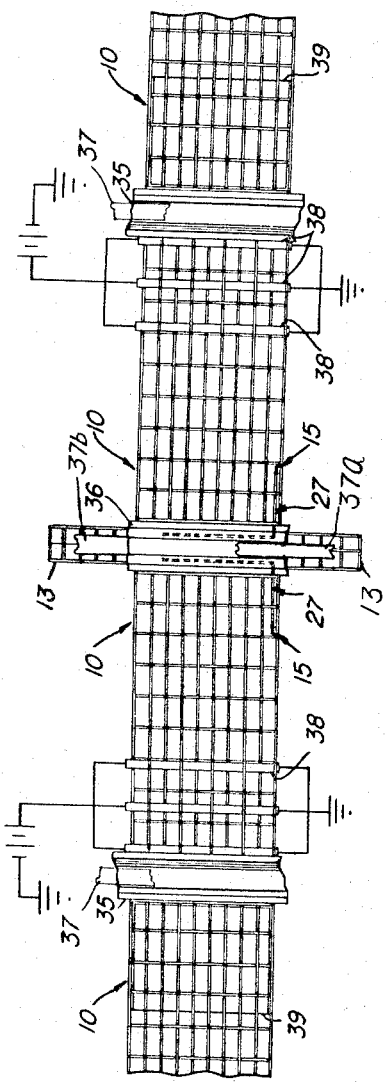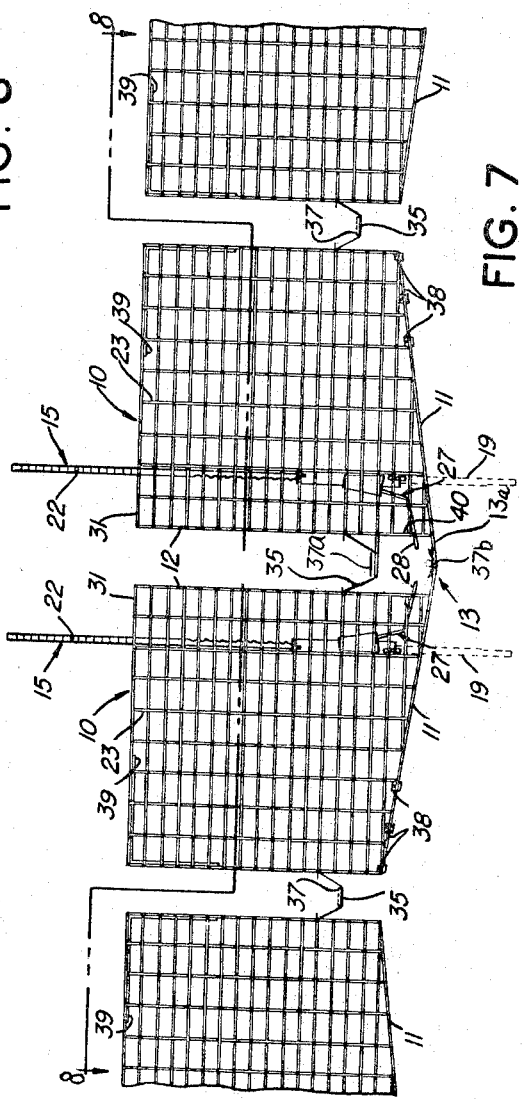

3,329,127
AUTOMATIC LAYING CAGE SYSTEM
Nat Cordis, deceased, late of Silver Lake, Wis., by Gladys S. Cordis, executor, Chicago, Ill., assignor of two-thirds to Carl F. Jensen and one-third to Gerald T. Dobie, both of Crown Industries, Rosemont, Ill.
Filed Mar. 22, 1966, Ser. No. 537,627
10 Claims. (Cl. 119—48)

This application is directed to certain of the subject matter heretofore described and claimed in application Ser. No. 355,525, filed Mar. 23, 1964, abandoned prior to this application, and also entitled "Automatic Laying Cage System," which application is a continuation of co-pending application Ser. No. 690,998, filed Oct. 18, 1957, now abandoned, and entitled "Automatic Egg Counter" which in turn is a continuation-in-part of co-pending application Ser. No. 435,335, filed June 8, 1954, now abandoned, and entitled "Egg Counter for Laying Cages."

This invention relates to poultry laying cages, to an egg collecting system for use in such cages and an egg counter associated with each cage.

In stallations of the type to which these improvements relate comprise continuous rows of open mesh cages arranged lengthwise of a poultry house, there being as many rows as the house will accommodate back-to-back or face-to-face. Each cage or compartment provides space for one to five laying hens, the hens occupying the same compartment during the entire production span, which incidentally varies from group to group.

A mechanical feed trough runs the length of the rows either between adjacent rows of cages or in a circuit about a pair of rows arranged back-to-back. A water trough, having a level control and drain runs the full length of the bank of cages.

Inasmuch as it is desirable to identify those hens which are not productive, it had been the practice to gather the eggs by hand from a ledge adjacent each cage and to manually record the productivity. Such a system is time consuming and wasteful of eggs since the breakage is high. On the other hand the desire to credit the layers with their productivity has discouraged the general acceptance of continuous egg collection systems.

The invention here provides a unique array of cages and continuous egg collection means with an egg counter for each compartment.

The egg collecting ledge may be disposed between the cages in which event the floors of the back-to-back cages are sloped inwardly. When such construction is used, a conveyor belt or tape may be used to tranfser the eggs to a collecting station. Of course, in such an arrangement the egg counter mechanism is hung within the individual cages adjacent the rear wall of each cage.

A suitable conveyor for the ledge may comprise a tape or webbing type conveyor, such conveyor being adapted to move the eggs toward one end of the row of cages.

The feed trough and the egg-receiving ledge may be vertically spaced from each other on the front of the cages or between the cages in the back-to-back array. A single over-under belt type conveyor with a single drive means may be used; one flight of the conveyor carries feed within the trough and the other flight carries eggs along the ledge to the collection station.

Thus the invention relates to automatic egg collecting in the poultry industry and more particularly to mechanizing egg collecting ledges in a community of poultry cages. Such cages are ordinarily made of wire mesh and each cage has a bottom of similar wire mesh, the mesh size being sufficiently large to guide the eggs from the cage to the mechanized collecting ledge. Accordingly, it will be understood that the eggs roll down the inclined bottom wall of the cage to the ledge.

In accordance with the described invention the poultry handling equipment may comprise a cage array having a plurality of cage rows and an elongated egg collecting ledge of wire mesh extending therebetween at a downwardly inclined angle from the opposed cage rows. A shallow trough is formed by the junction of the inclined ledges and defines ramps (floor extensions) forming a concave or trough-like support for the flexible conveyor belt which receives and conveys eggs rolling from the cages over the ramp portions of the floor extensions onto the belt where they center themselves as a result of the flexure of the belt to provide a shallow moving trough or channel which conforms to the general shape of the ledge trough.

The belt is endless and returns substantially parallel to the collection run and is vertically spaced therefrom. In the illustrated embodiments of FIGURES 7 and 8 the return run of the belt is above the collection run and serves the added function of conveying feed within the superposed trough. The trough, or segments thereof, in any event, supports the return run of the belt.

It will be seen that the described system shown in FIGURES 7 and 8 provides a simple and economical method for automating egg collection from conventional cage storage ledges such as shown in FIGURE 1 and accordingly the present invention offers a practical solution to the mechanizing of egg collection with a concave belt passing over the shallow trough/ledge as illustrated by FIGURES 7 and 8.

It is also contemplated that belt cleaning means such as a brush is not necessary for the removal of any feed which might adhere to the belt since it falls through the mesh of the eldge on moving thereover.

The counter referred to above comprises a cage stick which is lowered a notch by each egg from the compartment it is monitoring, this providing a positive record of the productivity of the compartment over a given period of time. Whenever desired, a visual inspection from one end of the row of cages will immediately identify the nonproductive units which can be removed and replaced.

Because of colder weather in many established poultry raising areas, the laying cage plan of egg production has been largely limited to the southern climes or to expensive poultry shelters. To adapt the laying cage system to poultry ranges or in pole type shleters on a year around basis, this invention further provides electrical heating units on the individual cages, one form of such heating unit being the commercially available "thermo-tape." To retain the body heat as well as the radiated heat from such cage units, a heat-insulating liner may be provided on the top and/or rear walls of the cage.

Further details of construction and advantages of the egg counter will become apparent as the description thereof proceeds in connection with the accompanying drawings wherein:

FIGURE 1 is an elevation of a nest assembly provided with the egg counter and heating units according to the invention;

FIGURE 2 is a plan view of the nest assembly of FIGURE 1;

FIGURE 3 is a side elevation of the counter mechanism;

FIGURE 4 is a rear view of the mechanism shown in FIGURE 3;

FIGURES 5 and 6 are fragmentary views of other embodiments of stop and lift means at the top of the gauge bar, and FIGURES 7 and 8 are a fragmentary elevation and plan view, respectively, of cages arranged face-to-face, according to the invention.

Referring to the drawings, the cages 10 are 8 to 10 inches wide, about 18 inches deep, and the height at the rear of the cage is about 16 inches. The slope of the cage floor 11 gives a height at the cage front 12 of about 18.5 inches. At the bottom of the front wall 30 is a port 40. The space between the rows of back-to-back cages 10 is from 3 to 5 inches and the egg ledges 13 are about 6 inches wide with an upstanding edge wall of about 2 inches. The cages themselves are now well-known in the art, and, accordingly, a further detailed description will not be necessary.

The egg counter 15 is hung by tabs 16 and 17 upon the cross wires of the wall of the cage 10 adjacent the front panel 11 as shown in FIGURES 1 and 2. The hangers 16 and 17 may comprise separate elements fixed to the casing 18, but preferably are tabs cut and folded from the casing wall as illustrated.

Within the casing 18, the stick or bar 19 is longitudinally movable. It is provided with a bottom stop 20 which prevents its full withdrawal from the casing by an upward pull on top lift 41 which also serves to prevent the free downward travel of bar 19.

In FIGURES 5 and 6 the top lift comprises a ring 42 secured by link 43 to the top of bar 19. A cord 44 may be looped through an array of counters and all reset by a pull on the cord 44 which is anchored at one or both ends of the array of cages 10.

A substantial portion of the bar 19 is provided with a rack 21 which, with ratchet 24, permits the step-by-step lowering of the bar 19 within the cage 10 and downwardly through the casing 19. On the upper portion of the bar 19 there is provided a scale 22 numbered from 0 to 15, the number opposite the top wall 23 of the cage 10 indicating the number of eggs which have rolled down the floor 11 of the cage 10 onto the ledge 13 since the last setting of the counter 15.

The rack 21 is released by the double-pronged ratchet escapement 24 which is pivoted about pin 25 within the housing or bracket 26 which is fixed to the casing 19. The escapement 24 is actuated by the movement of the angular trip arm 27. This trigger or trip arm 27 has a depending portion 28 which extends along the side wall of the cage 10 to a point outside the front wall 30 and is spaced about 2 inches above the sloping ramp portion 13a comprising a co-planar extension of the bottom or floor 11. A lateral extension 29 carried by the reach 28 lies substantially parallel to the egg ledge 13 and spaced to be contacted and lifted by an egg rolling down the floor 11, over the ramp 13a, and onto the collecting belt 37b. The weight of the trigger arm 27 restores the escapement 24 to its rack supporting position on the next successive tooth of the rack 21.

In operation, the bar 19 is lifted upwardly by lift-stop 41 until the stop 20 contacts the lower end of the casing 18. In this position, the numeral "0" on the scale 22 is disposed in alignment with the top wall 31 of the cage 10. As each egg is laid, it rolls down the floor 11 of the cage 10, lifting the trip arm 27 and thereby permitting the bar 19 to fall one notch below the escapement 24. This places the numeral "1" in alignment with the top wall 31 (or other reference mark carried by the cage). This is repeated with the delivery of each egg over the allotted period of two weeks. At that time, the indicated number of eggs is recorded by the operator on the record sheet carried by each cage and the mechanism is reset by lifting the bar 19 to its topmost position.

It is contemplated that revisions may be made in the details of construction of the egg counter 15. For example, the aligned supports for the pin 25 may comprise tabs cut and folded from the wall of the casing 18. In this way the hangers 16 and 17 and the supports for the pin 25 may be integral with the folded sheet which forms the casing 18. The escapement 24 may be a formed wire construction. Also, the trigger arm or lever 27 may be detachable at a point adjacent the escapement 24 so as to facilitate shipping, handling and assembly of the unit.

Reverting to FIGURES 1 and 2, the mechanical feeder trough 35 between the back-to-back cages 10 may include an endless conveyor 37 comprising feed-conveying tapes, webs, chains, cables, metal ribbons, etc., with or without transverse paddles. A watering trough 36 may be disposed along the front of the cages 10 as illustrated in the drawing, but may be arranged between the cages.

If desired, the feed trough 35 and the egg-receiving ledge 13 may be vertically spaced from each other on the front of the cages or between the cages in the back-to-back array. In such event, a single over-under belt type conveyor with a single drive means may be used; one flight 37a of the conveyor 37 carries feed within the trough 35 and the other flight 37b carries eggs along the ledge 13 to the collection station.

In FIGURES 1 and 2 the egg-receiving ledge 13 is disposed on opposite sides of the back-to-back array of cages 10. If desired, the cages can be arranged face-to-face with a single ledge 13 between them as shown in FIGURES 7 and 8. Thus, the sloping bottoms 11 of the cages 10 are arranged to slope centrally of the rows of face-to-face cages to deliver the eggs on the ledge 13 interposed the cages.

The cages can be arranged face-to-face with a single ledge 13 between them as shown in FIGURES 7 and 8. Thus, the sloping bottoms 11 of the cages 10 are arranged to slope centrally of the rows of face-to-face cages to deliver the eggs on the ledge 13 interposed the cages. In this embodiment, the doors to the individual cages are on the outside walls and this is true whether the cages are back-to-back or face-to-face. In any event, the egg counter 15 makes possible the use of automatic egg collecting means comprising an endless conveyor 37 on a ledge 13 having ramp portions 13a and serving a plurality of cages and a plurality of spaced apart rows of cages (FIGS. 7 and 8).

A suitable conveyor 37 for the ledge 13 may comprise a tape or webbing type conveyor, such conveyor being adapted to move the eggs toward one end of the row of cages 10 to a collection station (not shown). As shown in FIGURES 7 and 8, the egg-receiving ledge 13, shared by the spaced apart face-to-face arrays of cages 10, supports one flight 37b of an over-under belt type conveyor 37 with a single drive means (not shown); another flight 37a of the conveyor 37 is vertically spaced from flight 37b which carries eggs along the shallow trough, comprising the ramp extensions of the sloping bottoms 11. The flight 37b terminates at the egg collection station.

In FIGURES 1 and 2, there is schematically illustrated heater units 38 which are supported along the floor 11 and, as shown, these heaters comprise narrow ribbons or wires which are electrical resistance heaters. One form of such heater is commercially available as "Thermo-tape." Likewise, Nichrome or other source of low intensity heating may be used. Functionally, similar heating units may be applied to the lower portions of the side and rear walls of the cages 10. Heat-insulating and/or heat-reflecting liners 39 which are disposed at the rear portion of the top wall 23 and the upper portion of the rear wall may also be provided as shown in FIGURES 1 and 2.

Although the invention has been described by reference to particular embodiments thereof, it is to be understood that this is by way of illustration only. Accordingly, it is contemplated that modifications can be made in the disclosed invention by those skilled in the art without departing from the spirit of the invention.

What is claimed is:

1. Poultry cage apparatus including spaced parallel arrays of poultry cages having sloping floors, a joint egg-receiving ledge between said spaced arrays of cages, said ledge being constituted of ramp means co-planar with said sloping floors, spaced cage wall sections of said spaced arrays defining with said ledge an elongated channel between said arrays, a central longitudinal shallow trough portion in said ledge extending along said spaced cage arrays, and an endless egg-conveying belt means traveling over said shallow trough and along said ledge between said ramp means to transport commingled eggs delivered thereto over said ramp means from the sloping floors of said poultry cages in said arrays, said belt means being narrower than the total width of said ledge.

2. The poultry cage apparatus of claim 1 which includes a plurality of partitions extending transversely of said arrays to form a plurality of individual bird compartments, said ledge extending longitudinally of the series of enclosures and said ramp means comprising a sloping co-planar extension of the lower edge of the sloping floors, a first trough disposed above and parallel to said ledge, an endless conveyor belt disposed within said trough and along said ledge, means to advance the belt relative to said trough and ledge, and guard means extending longitudinally of the enclosure adjacent said ledge to form a barrier to prohibit access of a bird within a compartment to said ledge, said guard means being spaced vertically from the floor to permit passage of an egg from within a compartment over said sloping floor and intervening ramp onto said concave belt in said shallow trough.

3. The poultry cage apparatus of claim 1 which includes an egg-delivery port in the forward wall of said cage array, a casing, means for mounting said casing within each such cage inwardly of the wall having the egg-delivery port, a scaled signal bar releasably supported within said casing, the upper end of said bar extending above the top wall of such a cage so that its position can be viewed from the end of the row of cages, a lift-stop at the upper end of said bar, a progressive release means for said bar mounted on said casing, a trip means connected to said release means and extending outwardly of said casing toward said delivery port, said trip means including a laterally extending arm disposed across such delivery port to intercept any egg rolling down said sloping floor and ramp portion into said collection and conveyor means whereby non-productivity can be spotted for culling by the elevated position of the signal bar and the actual number of eggs delivered is indicated on the scale on said bar by the top wall of said cage.

4. The poultry cage apparatus of claim 1 which includes ribbon electrical heaters disposed in two or more cages in the lower portions thereof.

5. The poultry cage apparatus of claim 4 wherein the cage floor is of open wire mesh and the said heaters are the wire mesh forming the cage enclosure.

6. The poultry cage apparatus of claim 1 wherein said egg counter means comprises individual counters at each cage, and means extending along said cage array to reset a plurality of counters simultaneously.

7. The poultry cage apparatus of claim 6 wherein said reset means includes a cable strung along the array of cages and operatively associated with each said counter to reset it.

8. The poultry cage apparatus of claim 1 which includes a plurality of partitions extending transversely of the array to form a plurality of individual bird compartments, the said joint ledge extending longitudinally of the series of enclosures each half thereof comprising a planar extension of the associated sloping floor, said floor extensions together providing a ramp and a shallow trough-like ledge, a fixed trough disposed above and parallel to said ledge, an endless conveyor belt disposed within said trough and over said ledge, means to advance the belt relative to said trough and ledge, and partition means extending longitudinally of the enclosure adjacent said ledge to form a barrier adjacent said delivery port to prohibit access of a bird within a compartment to the concave belt on said ledge, said partition means being spaced vertically from the floor to permit passage of an egg through said delivery port from within a compartment onto said belt on said ledge.

9. The automatic laying cage system of claim 1 wherein each half of the egg-receiving ledge constituting the longitudinal shallow trough consists of planar extensions of the associated sloping floors of opposed arrays of poultry cages, the said floors and extensions consisting of open-mesh wire panels, the mesh size being sufficiently small to prevent the passage of eggs therethrough and the egg-conveying belt means includes an endless, flexible belt, and adapted to conform to the concave contour of the central portion of shallow trough/ledge thereby to receive and cradle eggs delivered by gravity from the sloping floors of the cages, and said conveying belt means further includes vertically spaced belt guide means of generally U-shaped cross-section and supported by said cages in substantial alignment with the longitudinal axis of said shallow trough, the width of the said belt being less than, but substantially co-extensive with, the width of said belt guide means.

10. The poultry cage apparatus of claim 1 wherein said cage arrays have a plurality of enclosures;
said trough comprises downwardly inclined wire mesh extensions of the bottoms of said enclosures to provide said ledge therebetween
  characterized by having a longitudinal depression intermediate said enclosures and forming a shallow concave support for said belt;
said belt, after completion of conveying along said trough, returning over a path parallel to said trough through support means vertically spaced therefrom; and
said support means extends along said trough and having an horizontal portion spaced therefrom,
  said last-mentioned means being essentially U-shaped in cross section and providing support for the return run of said conveyor belt means parallel to said egg collecting trough.

References Cited

UNITED STATES PATENTS

| | | | |
|---|---|---|---|
| 1,202,967 | 10/1916 | Chapman | 235—124 |
| 2,262,441 | 11/1941 | Frederic | 119—48 |
| 2,305,708 | 12/1942 | Jacobsen | 235—98 |
| 2,585,443 | 2/1952 | Cox | 219—46 |
| 2,702,503 | 2/1955 | Wildhaber | 98—33 |
| 2,710,682 | 6/1955 | Coll | 198—20 |
| 2,745,379 | 5/1956 | Schmidt | 119—48 |
| 2,756,721 | 7/1956 | Hayes | 119—48 |
| 3,180,314 | 4/1965 | Van Huis et al. | 119—48 |
| 3,225,741 | 12/1965 | Ernst | 119—48 |
| 3,241,523 | 3/1966 | Kurtz et al. | 119—48 |

SAMUEL KOREN, *Primary Examiner.*

ALDRICH F. MEDBERY, *Examiner.*